United States Patent
Wu et al.

(10) Patent No.: US 11,714,701 B2
(45) Date of Patent: Aug. 1, 2023

(54) TROUBLESHOOTING FOR A DISTRIBUTED STORAGE SYSTEM BY CLUSTER WIDE CORRELATION ANALYSIS

(71) Applicant: VMware, Inc., Palo Alto, CA (US)

(72) Inventors: Yu Wu, Shanghai (CN); Sifan Liu, Shanghai (CN); Jin Feng, Shanghai (CN); Chen Jing, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/539,219

(22) Filed: Dec. 1, 2021

(65) Prior Publication Data
US 2023/0168962 A1  Jun. 1, 2023

(51) Int. Cl.
*G06F 11/07* (2006.01)
*G06F 3/06* (2006.01)

(52) U.S. Cl.
CPC .......... *G06F 11/0793* (2013.01); *G06F 3/067* (2013.01); *G06F 3/0619* (2013.01); *G06F 3/0659* (2013.01); *G06F 11/0709* (2013.01); *G06F 11/0727* (2013.01); *G06F 11/0772* (2013.01)

(58) Field of Classification Search
CPC ............ G06F 11/0793; G06F 11/0709; G06F 11/0727; G06F 11/0772
See application file for complete search history.

(56) References Cited

U.S. PATENT DOCUMENTS

| 9,047,348 | B2 | 6/2015 | Dayan |
| 10,613,962 | B1 * | 4/2020 | Delange ................. G06N 7/005 |
| 10,880,194 | B2 * | 12/2020 | Avdesh Khanna ..... H04L 67/10 |

* cited by examiner

*Primary Examiner* — Nadeem Iqbal
(74) *Attorney, Agent, or Firm* — Su IP Consulting (57) ABSTRACT

A troubleshooting technique provides faster and more efficient troubleshooting of issues in a distributed system, such as a distributed storage system provided by a virtualized computing environment. The distributed system includes a plurality of hosts arranged in a cluster. The troubleshooting technique uses cluster-wide correlation analysis to identify potential causes of a particular issue in the distributed system, and executes workflows to remedy the particular issue.

20 Claims, 5 Drawing Sheets

TROUBLESHOOTING FOR A DISTRIBUTED STORAGE SYSTEM BY CLUSTER WIDE CORRELATION ANALYSIS

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

A software-defined approach may be used to create shared storage for VMs and/or for some other types of entities, thereby providing a distributed storage system in a virtualized computing environment. Such software-defined approach virtualizes the local physical storage resources of each of the hosts and turns the storage resources into pools of storage that can be divided and accessed/used by VMs or other types of entities and their applications. The distributed storage system typically involves an arrangement of virtual storage nodes that communicate data with each other and with other devices.

One type of virtualized computing environment that uses a distributed storage system is a hyperconverged infrastructure (HCI) environment, which combines elements of a traditional data center: storage, compute, networking, and management functionality. HCI environments may be configured as a stretched cluster, wherein hosts of a cluster are deployed in separate geographic locations, such as hosts of a first site being at a first geographic location and hosts of a second site being at a second geographic location.

It can be challenging to effectively and efficiently troubleshoot (diagnose) issues that occur in a distributed storage system. Troubleshooting issues can become even more challenging in distributed storage systems that are large-scale and deployed in a complex computing environment.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be implemented in connection with other embodiments whether or not explicitly described.

The present disclosure addresses various drawbacks associated with troubleshooting (diagnosing) issues in a distributed system, such as a distributed storage system provided by a virtualized computing environment. Unlike conventional troubleshooting techniques that are often very rudimentary, the improved troubleshooting techniques disclosed herein are usable with and effective/efficient for large-scale distributed storage systems that are deployed in a complex computing environment, such a distributed storage system having multiple clusters of hosts (including stretched cluster configurations). According to various embodiments, the improved troubleshooting techniques disclosed herein use cluster-wide correlation analysis to identify issues in a distributed system, such as a distributed storage system.

Computing Environment

Figure 1:
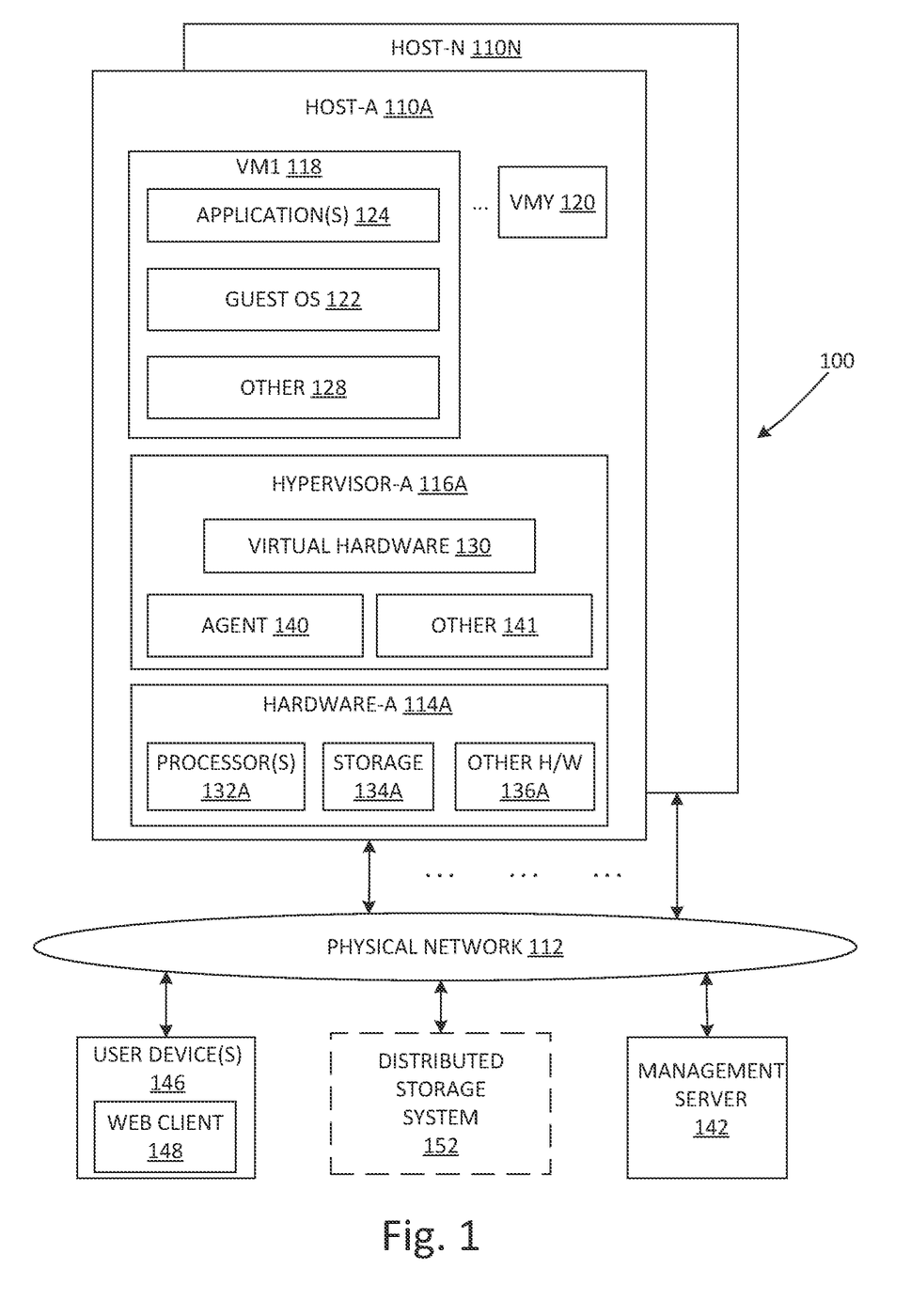
FIG. 1 is a schematic diagram illustrating an example virtualized computing environment that can implement troubleshooting by cluster-wide correlation analysis.

Various implementations will now be explained in more detail using FIG. 1, which is a schematic diagram illustrating an example virtualized computing environment 100 that can perform troubleshooting by cluster-wide correlation analysis. More specifically, FIG. 1 is a schematic diagram illustrating an example virtualized computing environment 100 that can implement cluster-wide analysis to troubleshoot (e.g., diagnose/identify) issues that are present in one or more components of the virtualized computing environment 100. Depending on the desired implementation, the virtualized computing environment 100 may include additional and/or alternative components than that shown in FIG. 1. The virtualized computing environment 100 will also be described below in the context of how conventional troubleshooting techniques are deficient in identifying issues, and how the improved troubleshooting techniques (using cluster-wide analysis) provide advantages over conventional troubleshooting techniques in the virtualized computing environment 100.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other hosts can include substantially similar elements and features.

The host-A 110A includes suitable hardware-A 114A and virtualization software (e.g., hypervisor-A 116A) to support various virtual machines (VMs). For example, the host-A 110A supports VM1 118 . . . VMY 120, wherein Y (as well as N) is an integer greater than or equal to 1. In practice, the virtualized computing environment 100 may include any number of hosts (also known as "computing devices", "host computers", "host devices", "physical servers", "server systems", "physical machines," etc.), wherein each host may be supporting tens or hundreds of virtual machines. For the sake of simplicity, the details of only the single VM1 118 are shown and described herein.

VM1 118 may include a guest operating system (OS) 122 and one or more guest applications 124 (and their corresponding processes) that run on top of the guest operating system 122. VM1 118 may include still further other elements 128, such as a virtual disk, agents, engines, modules, and/or other elements usable in connection with operating VM1 118.

The hypervisor-A 116A may be a software layer or component that supports the execution of multiple virtualized computing instances. The hypervisor-A 116A may run on top of a host operating system (not shown) of the host-A 110A or may run directly on hardware-A 114A. The hypervisor-A 116A maintains a mapping between underlying hardware-A 114A and virtual resources (depicted as virtual hardware 130) allocated to VM1 118 and the other VMs. The hypervisor-A 116A of some implementations may include/run one or more health monitoring agents 140, which will be described in further detail below. In some implementations, the agent 140 may reside elsewhere in the host-A 110A (e.g., outside of the hypervisor-A 116A).

The hypervisor-A 116A may include or may operate in cooperation with still further other elements 141 residing at the host-A 110A. Such other elements 141 may include drivers, agent(s), daemons, engines, virtual switches, and other types of modules/units/components that operate to support the functions of the host-A 110A and its VMs, as well as functions associated with using storage resources of the host-A 110A for distributed storage.

Hardware-A 114A includes suitable physical components, such as CPU(s) or processor(s) 132A; storage resources(s) 134A; and other hardware 136A such as memory (e.g., random access memory used by the processors 132A), physical network interface controllers (NICs) to provide network connection, storage controller(s) to access the storage resources(s) 134A, etc. Virtual resources (e.g., the virtual hardware 130) are allocated to each virtual machine to support a guest operating system (OS) and application(s) in the virtual machine, such as the guest OS 122 and the applications 124 in VM1 118. Corresponding to the hardware-A 114A, the virtual hardware 130 may include a virtual CPU, a virtual memory, a virtual disk, a virtual network interface controller (VNIC), etc.

Storage resource(s) 134A may be any suitable physical storage device that is locally housed in or directly attached to host-A 110A, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, integrated drive electronics (IDE) disks, universal serial bus (USB) storage, etc. The corresponding storage controller may be any suitable controller, such as redundant array of independent disks (RAID) controller (e.g., RAID 1 configuration), etc.

A distributed storage system 152 may be connected to each of the host-A 110A . . . host-N 110N that belong to the same cluster of hosts. For example, the physical network 112 may support physical and logical/virtual connections between the host-A 110A . . . host-N 110N, such that their respective local storage resources (such as the storage resource(s) 134A of the host-A 110A and the corresponding storage resource(s) of each of the other hosts) can be aggregated together to form a shared pool of storage in the distributed storage system 152 that is accessible to and shared by each of the host-A 110A . . . host-N 110N, and such that virtual machines supported by these hosts may access the pool of storage to store data. In this manner, the distributed storage system 152 is shown in broken lines in FIG. 1, so as to symbolically convey that the distributed storage system 152 is formed as a virtual/logical arrangement of the physical storage devices (e.g., the storage resource(s) 134A of host-A 110A) located in the host-A 110A . . . host-N 110N. However, in addition to these storage resources, the distributed storage system 152 may also include stand-alone storage devices that may not necessarily be a part of or located in any particular host.

According to some implementations, two or more hosts may form a cluster of hosts that aggregate their respective storage resources to form the distributed storage system 152. The aggregated storage resources in the distributed storage system 152 may in turn be arranged as a plurality of virtual storage nodes. Other ways of clustering/arranging hosts and/or virtual storage nodes are possible in other implementations.

A management server 142 (or other network device configured as a management entity) of one embodiment can take the form of a physical computer or with functionality to manage or otherwise control the operation of host-A 110A . . . host-N 110N, including operations associated with the distributed storage system 152. In some embodiments, the functionality of the management server 142 can be implemented in a virtual appliance, for example in the form of a single-purpose VM that may be run on one of the hosts in a cluster or on a host that is not in the cluster of hosts. The management server 142 may be operable to collect usage data associated with the hosts and VMs, to configure and provision VMs, to activate or shut down VMs, to monitor health conditions and diagnose/troubleshoot and remedy operational issues that pertain to health, and to perform other managerial tasks associated with the operation and use of the various elements in the virtualized computing environment 100 (including managing the operation of and accesses to the distributed storage system 152).

The management server 142 may be a physical computer that provides a management console and other tools that are directly or remotely accessible to a system administrator or other user. The management server 142 may be communicatively coupled to host-A 110A . . . host-N 110N (and hence communicatively coupled to the virtual machines, hypervisors, hardware, distributed storage system 152, etc.) via the physical network 112. In some embodiments, the functionality of the management server 142 may be implemented in any of host-A 110A . . . host-N 110N, instead of being provided as a separate standalone device such as depicted in FIG. 1.

A user may operate a user device 146 to access, via the physical network 112, the functionality of VM1 118 . . . VMY 120 (including operating the applications 124), using a web client 148. The user device 146 can be in the form of a computer, including desktop computers and portable computers (such as laptops and smart phones). In one embodiment, the user may be an end user or other consumer that uses services/components of VMs (e.g., the application 124) and/or the functionality of the distributed storage system 152. The user may also be a system administrator that uses the web client 148 of the user device 146 to remotely communicate with the management server 142 via a management console for purposes of performing management operations.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

It can be challenging to effectively or efficiently use conventional troubleshooting techniques for diagnosing issues in the virtualized computing environment 100 that implements a large-scale distributed storage system 152. For example, conventional troubleshooting techniques that use root cause diagnosis may take significant time (e.g., several days) to accurately identify a root cause of an issue. It may also be challenging for such conventional troubleshooting techniques to timely and accurately provide recommendations for remedying the issue. Significant effort by support engineering staff may be needed and is costly, and the lengthy, costly, and ineffective/inefficient troubleshooting process may result in bad user experience.

As an example, a distributed system may have already been experiencing an issue for several days by the time that the issue becomes visible to a user, and the user then reports that the issue is impacting their application or workload. There are often few clues that may be analyzed when the issue is reported by the user. Poor user experience will result if another several days are spent troubleshooting.

Furthermore, a distributed system (such as depicted by the virtualized computing environment 100) may involve a complex arrangement of a large number of different hardware and software components. There may be several kinds of errors in the distributed system, and it may be difficult to determine which error is the root cause or major cause. Troubleshooting each individual error and/or each affected component can be time consuming.

As another example, distributed systems may typically be provided with fault-tolerant features such as high availability (HA) capability, wherein if a particular component within a cluster fails, a backup component in the same or different cluster is available to perform the operations that were being performed by the failed component. Traditional troubleshoot techniques that are based on simple event correlation do not work well in situations where an error (e.g., a failed component) can be tolerated with relatively minimal impact when viewed from a cluster-wide perspective. Due to the fault-tolerant design, it can be challenging to evaluate how some issues will impact the whole distributed system, as well as the severity of the impact. For instance, it can be difficult to determine the criticality of a disk input/output (I/O) error, since auto-recovery may be performed most of the time by reading data from a backup copy.

As still another example, the experience of support engineering staff may be important in some situations to troubleshoot a complex issue in a complex distributed system. This reliance upon the experience of support engineering staff may not be sustainable over time such as if the support engineering staff changes roles in a company or leaves the company.

The various embodiments disclosed herein address the above and other drawbacks of conventional troubleshooting techniques, by providing improved troubleshooting techniques that can diagnose and resolve issues quickly and efficiently, with decreased reliance upon support engineering staff. Moreover, the improved troubleshooting techniques disclosed herein may be proactive in that potential critical/major issue(s) may be identified, before the user finds and reports the issue(s).

Instead of trying to determine a root cause of a specific issue, the embodiments disclosed herein provide guided troubleshooting by listing all potential causes of an issue, ordered by priority and with a recommendation (e.g., a troubleshooting workflow) for a remedy for each cause, such that the potential causes may be evaluated in sequence and the corresponding recommendation applied thereto, with the evaluation of the potential cause and application of the corresponding recommendation being repeated as needed until the issue is remedied.

The various embodiments disclosed herein correlate an abnormal event with possible/potential causes and/or with other events, logs the event and health status information, and saves all of this data as historical data to assist in troubleshooting. Also, more than just correlation of each relevant event (e.g., event A may cause event B) may be performed--an analysis also may be performed to determine the scope of impact of the event. For instance, when there is disk I/O or latency issue, the troubleshooting technique not only just correlates a VM I/O issue or performance issue with a potential cause, but also tracks the scope of impact of the issue (e.g., the I/O of a host will impact the disk or data component of the host).

Embodiments of the improved troubleshooting technique may also leverage the correlation to determine how a specific issue (like a disk I/O issue) impacts the distributed system and the severity of the impact. More specifically, various embodiments, in addition to correlating different types of events (e.g., disk I/O and VM I/O), also perform correlation among different layers such as correlation of host-level performance with cluster-level performance. For example, lower priority may be given for a remedy if an issue is determined to be a disk I/O performance issue, since data can be read from another copy in another host/disk. However, higher priority for remedial action may be taken if an issue has caused a cluster-level performance downgrade.

The foregoing and other features of embodiments of the improved troubleshooting techniques are described in further detail next below.

Troubleshooting by Performing Cluster-Wide Correlation Analysis

Figure 2:
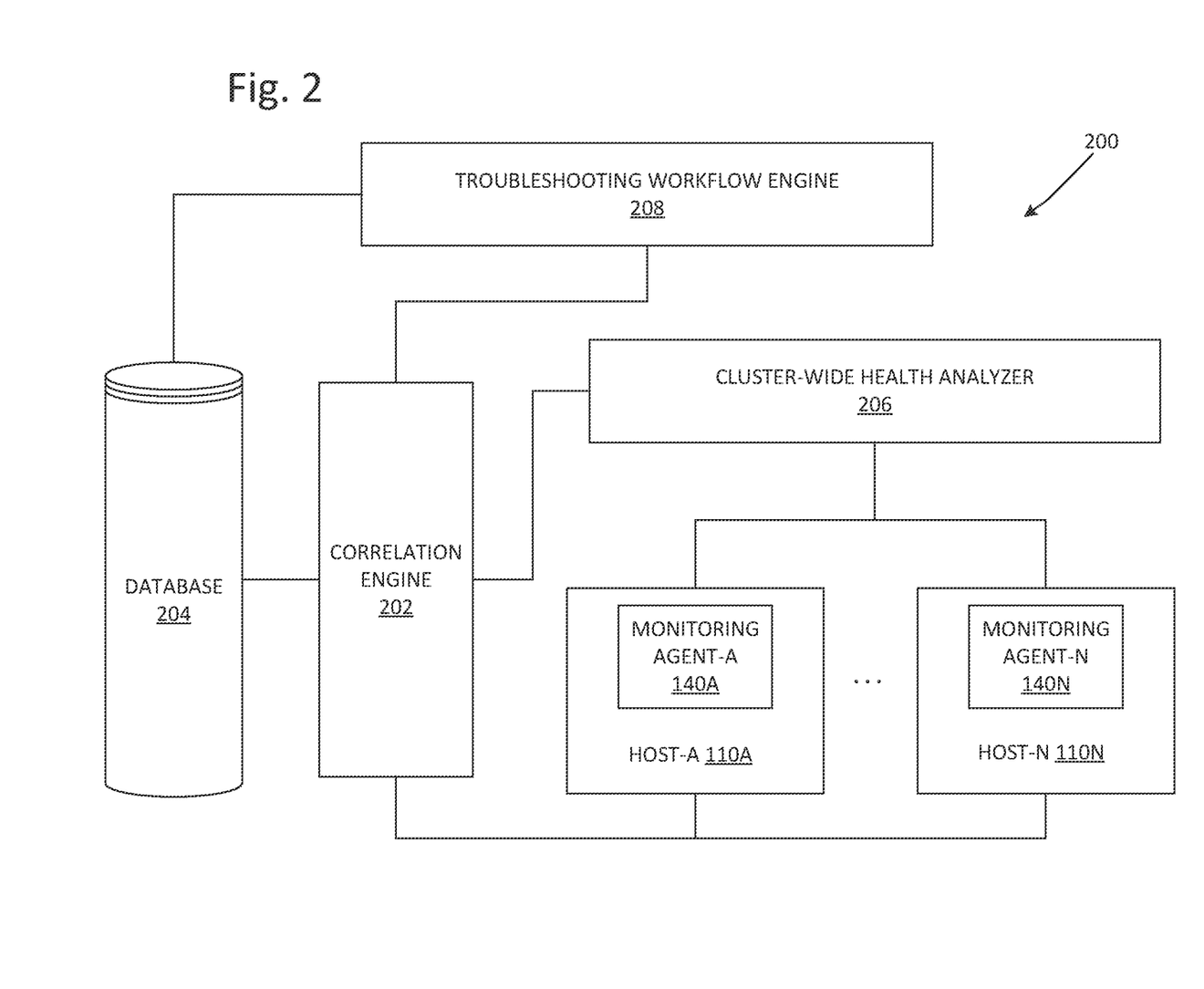
FIG. 2 is a schematic diagram illustrating example components that may be used to perform troubleshooting by cluster-wide correlation analysis.

FIG. 2 is a schematic diagram illustrating example components that may be used to perform troubleshooting by cluster-wide correlation analysis. More specifically, FIG. 2 shows a system 200 that includes components (which may reside at the management server 142 and at host-A 110A . . . host-N 110N of the virtualized computing environment 100 of FIG. 1) that cooperate with each other to perform troubleshooting.

The system 200 includes a plurality of health monitoring agents 140A . . . 140N, a correlation engine 202, a database 204 (or other storage device/location or data structure), a cluster-wide health analyzer 206, and a troubleshooting workflow engine 208. These various components of the system 200 may be communicatively coupled to each other for purposes of performing troubleshooting-related operations, such as data collection, correlation, providing recommendations, etc.

According to various embodiments, the health monitoring agents 140A . . . 140N (e.g., each also represented as the agent 140 in FIG. 1) may respectively reside at host-A 110A . . . host-N 110N (e.g., nodes). One or more of the correlation engine 202, database 204, cluster-wide health analyzer 206, and troubleshooting workflow engine 208 may reside at the management server 142. In other embodiments, such components may reside outside of the management server 142 (e.g., in a single-purpose VM or other location) and are in communication with (e.g., accessible to or operated by) the management server 142. One or more of the health monitoring agents 140A . . . 140N, correlation engine 202, cluster-wide health analyzer 206, and troubleshooting workflow engine 208 may be embodied in some implementations as computer-readable instructions stored on a non-transitory computer-readable medium and executable by one or more processors coupled to the computer-readable medium.

Each of the health monitoring agents 140A . . . 140N is configured to run in their respective host to collect various types of statistical host-level information related to the health of the host, such as disk, network, and host performance data, operational data, and other health-related metric information that is local to the host. Each of the health monitoring agents 140A . . . 140N also calls the correlation engine 202 to store such host-level metric information in the database 204, with a timestamp and correlation information (provided to by the correlation engine 202) attached to the host-level metric information being stored in the database 204. As will be described further below, such correlation information can be used during troubleshooting for correlating with a particular user-visible issue or other type of issue.

The cluster-wide health analyzer 206 is configured aggregate the host-level metric information collected by each of the health monitoring agents 140A . . . 140N, so as to generate a cluster-level (cluster-wide) metric information about the health of the cluster (comprised of host-A 110A . . . host-N 110N). The cluster-wide health analyzer 206 calls the correlation engine 202 to store such cluster-level metric information in the database 204, with a timestamp and correlation information (provided to by the correlation engine 202) attached to the cluster-level metric information being stored in the database 204.

The correlation engine 202 is configured to perform at least two tasks. For a first task, the correlation engine 202 is configured to use the host-level and cluster-level metric information (from the health monitoring agents 140A . . . 140N) to correlate different errors (e.g., events) that may have a potential relationship. For example, a disk failure or a failure of the host are two types of errors/events that cause a resulting data accessibility issue, and so the correlation engine 202 may perform a correlation so as to indicate that the data accessibility issue may be caused by the disk/host failures.

In some situations, the correlation engine 202 may not know for certain if an error A is actually caused by an error B. However, the correlation engine 202 of various embodiments may still correlate error A with error B as long as there is some potential causation, since such correlation may be useful in guided troubleshooting (described later below). Such a guided troubleshooting feature (using troubleshooting workflows that will be described later below) also differentiates from root caused-based troubleshooting approaches that have limited use cases and are difficult to apply in an actual production environment.

For a second task and as previously stated above, the correlation engine 202 is configured to attach possible correlation information to the host-level and cluster-level metric information collected by the health monitoring agents 140A . . . 140N, during the process of storing such metric information in the database 204. As an example, when a disk I/O error occurs, the occurrence of the error does not mean that there is always a user-visible issue or cluster-level issue that results from the disk I/O error, since the nature of the fault-tolerant design of the distributed storage system 152 enables the issue to be addressed with relatively minimal disruption/visibility to the user/cluster. However, correlation information pertaining to the disk I/O error (saved as historical data in the database 204) can serve as useful troubleshooting information when/if more user-visible or other significant errors occur later, such as if the host-level performance issue begins to affect cluster-level performance. Therefore, the correlation engine 202 can attach correlation information to any individual event/error so that such correlation information may be used for historical reference when subsequent correlations need to be later performed in response to the occurrence of other errors.

An example of the correlation information attached by the correlation engine 202 to the metric information stored in the database 204 may be as follows:

{
"Issue Category":[Can be any value like "Performance", "Data Availability", etc.]
"Impacted Component":[Can be any value like "Disk", "Network", "Host", "Server Daemon", etc.]
"Impacted Operations":[Can be any value like "Disk Read", "Disk Write", "Network Data Transmit", etc.]
}

In the foregoing example, the correlation engine 202 correlates (e.g., relates or links) three pieces of information to each other: an issue category, an impacted component, and impacted operations. For instance, if "Data Availability" is the issue category, then the potentially impacted component(s) can be one or more of a disk, network device (e.g., a NIC), a host, server daemon, etc., and the potentially impacted operations may be one or more of disk reading/writing, network data transmission, etc.

Still referring to FIG. 2, the troubleshooting workflow engine 208 is configured to access the database 204 so as to retrieve the historical information stored therein, for purposes of generating a guided step by step troubleshooting workflow. This troubleshooting workflow may be used by the troubleshooting workflow engine 208 to guide a user (e.g., a system administrator) in troubleshooting a specific issue in the distributed system, as will be described next with respect to FIGS. 3 to 6.

Figure 3:
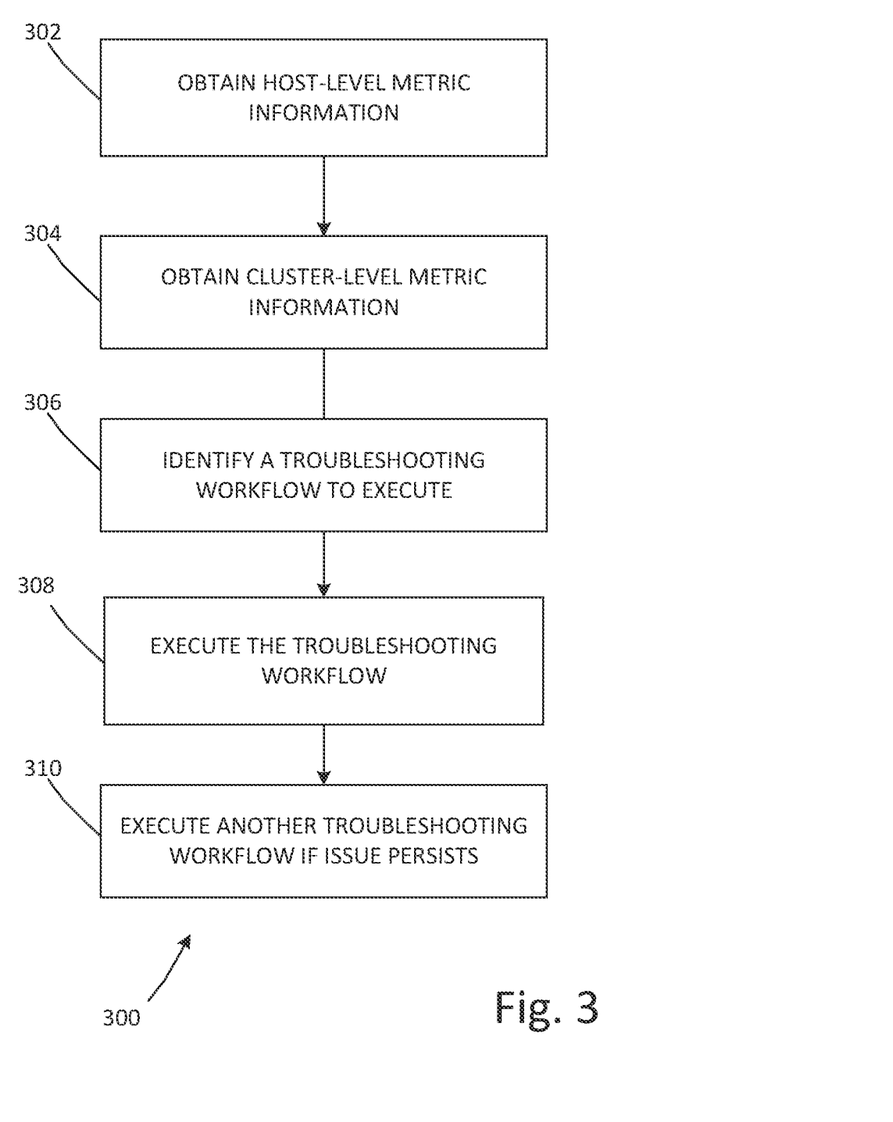
FIG. 3 is a flowchart of an example troubleshooting method that can be performed by the components in FIG. 2 in the virtualized computing environment of FIG. 1.

FIG. 3 is a flowchart of an example troubleshooting method 300 that can be performed by the components in FIG. 2 in the virtualized computing environment of FIG. 1. For instance, the method 300 may be an algorithm performed at least in part by the troubleshooting workflow engine 208 in cooperation with the other components of the system 200 in FIG. 2.

The example method 300 may include one or more operations, functions, or actions illustrated by one or more blocks, such as blocks 302 to 310. The various blocks of the method 300 and/or of any other process(es) described herein may be combined into fewer blocks, divided into additional blocks, supplemented with further blocks, and/or eliminated based upon the desired implementation. In one embodiment, the operations of the method 300 and/or of any other process(es) described herein may be performed in a pipelined sequential manner. In other embodiments, some operations may be performed out-of-order, in parallel, etc.

The method 300 may begin at a block 302 ("OBTAIN HOST-LEVEL METRIC INFORMATION"), wherein the system 200 uses the agent(s) 140 to collect host-level metric information that pertains to health of each respective host in a cluster. The correlation engine 202 may then store the host-level metric information, along with correlation information, in the database 204 as historical data.

The block 302 may be followed by a block 304 ("OBTAIN CLUSTER-LEVEL METRIC INFORMATION"), wherein the cluster-wide health analyzer 206 may aggregate the host-level metric information to generate cluster-level metric information. The correlation engine 202 obtains this cluster-level metric information from the cluster-wide health analyzer 206 and stores this cluster-level metric information in the database 204 as historical data.

The block 304 may be followed by a block 306 ("IDENTIFY A TROUBLESHOOTING WORKFLOW TO EXECUTE"), wherein the correlation engine 202 calls the troubleshooting workflow engine 208 to identify at least one troubleshooting workflow to execute in order to remedy a particular issue that has been encountered in the distributed system. For example, the host-level and/or cluster-level information may indicate that there is problem such as a performance degradation issue. The correlation engine 202 in cooperation with the agent(s) 140 may then determine the components affected or potentially affected by the performance degradation issue and/or the operations affected or potentially affected by the performance degradation issue. Thus, based at least in part on the detected performance degradation issue, the impacted components, and/or the impacted operations, the correlation engine 202 may access the database 204 to search for and locate (using the previously described correlation information) matches that indicate potential causes of the same/similar performance degradation issue that have been historically recorded for such components/operations. Issues may be deemed to be the same/similar to each other (or deemed to correlate with each other), for example, if at least some of their correlation information (e.g., issue category, impacted component(s), impacted operation(s), etc.) matches.

Based on the potential causes thus identified, the correlation engine 202 may then call the troubleshooting workflow engine 208 at the block 306 in order to enable the troubleshooting workflow engine 208 to identify multiple troubleshooting workflows that correspond to the potential causes and that may be executed to remedy the particular performance degradation issue. The troubleshooting workflows may be stored in and retrieved from the database 204 and/or from some other storage location accessible by the troubleshooting workflow engine 208.

The block 306 may be followed by a block 308 ("EXECUTE THE TROUBLESHOOTING WORKFLOW"), wherein the management server 142 executes each of the troubleshooting workflows provided by the troubleshooting workflow engine 208, until the performance degradation issue no longer exists after execution of a particular troubleshooting workflow. The troubleshooting workflows may be executed according to a priority assigned to each troubleshooting workflow. Moreover, for various embodiments, the root cause of the degradation issue ultimately may not be determined or may not need to be determined—what is notable is that the performance degradation issue may be remedied/overcome by executing a particular troubleshooting workflow, without necessarily knowing the actual root cause of the particular performance degradation issue.

At a block 310 ("EXECUTE ANOTHER TROUBLESHOOTING WORKFLOW IF ISSUE PERSISTS"), the management server 142 may execute another troubleshooting workflow, if the performance degradation issue still exists after execution of a previous troubleshooting workflow. The block 310 repeats until execution of a particular troubleshooting workflow successfully remediates the performance degradation issue.

Figure 4:
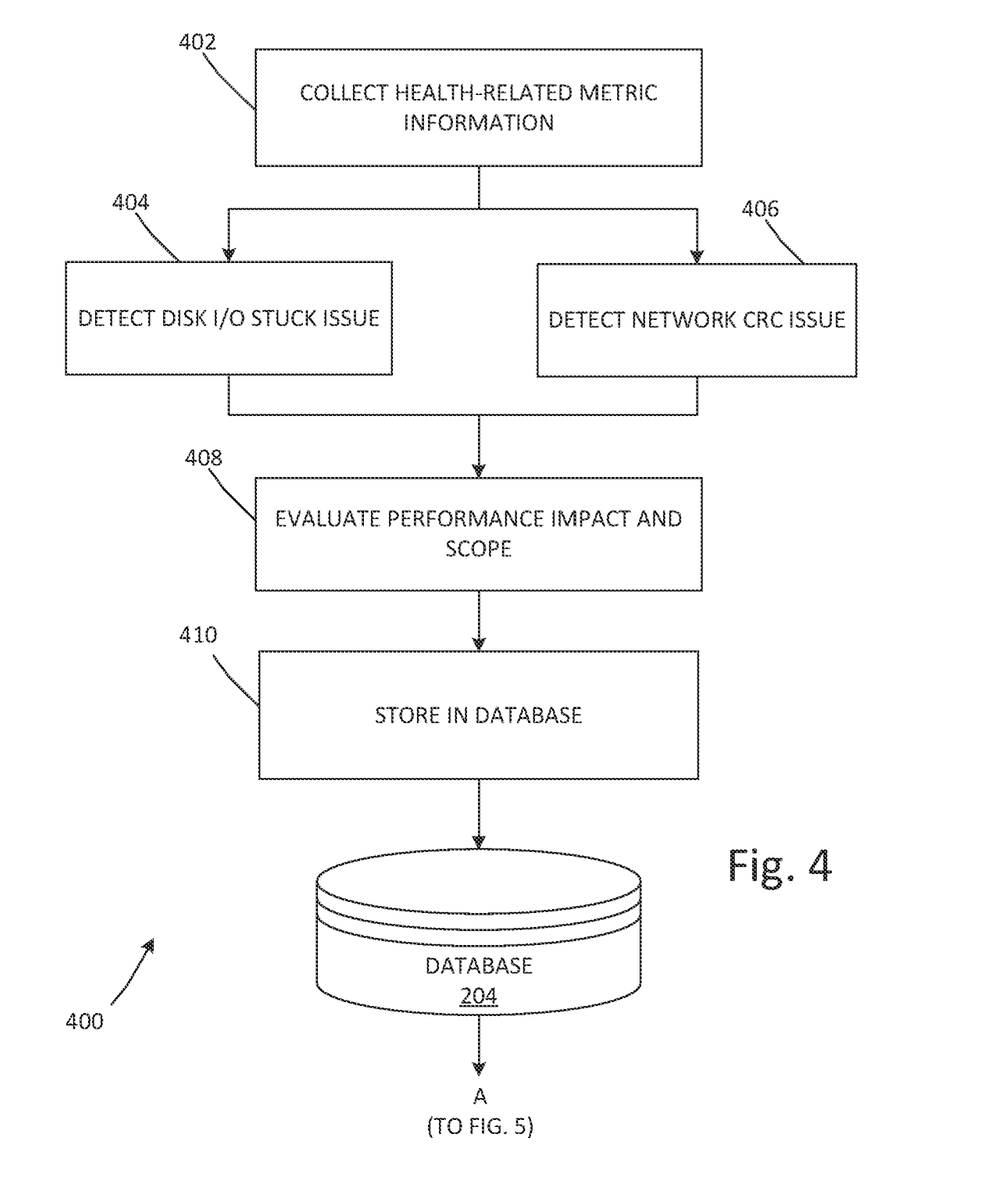
FIGS. 4 and 5 are flowcharts of an example use case that illustrates the troubleshooting of an issue.
Figure 5:
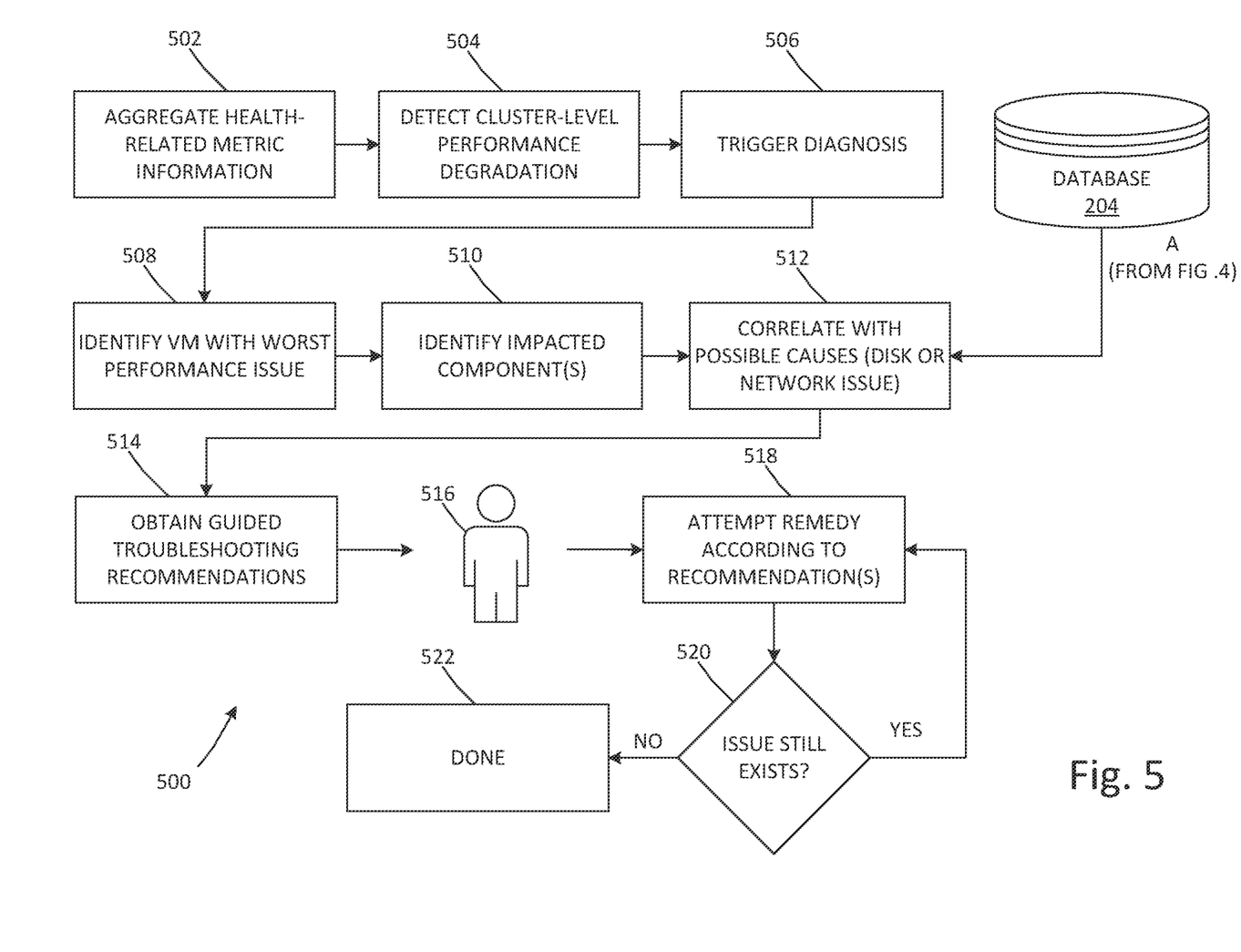

FIGS. 4 and 5 are flowcharts of an example use case that illustrates the troubleshooting of an issue. Assume for example that the distributed storage system 152 is experiencing a high latency issue for some of VMs running at the hosts/nodes. An impact to the user(s) is that several applications 124 deployed on those VMs are timed out.

If a conventional troubleshooting technique is used, several support engineers may work a number of days to troubleshoot and find the root cause for the high latency. The steps in a manual process for such conventional troubleshooting technique may involve the following:

1. Identifying a network issue (e.g., network cyclic redundancy check (CRC) errors) for the physical NICs used by the VMs and network traffic;

2. Taking several more days to apply a network patch and involving a network vendor to address the network issue. However, the network issue still remains (not fixed) despite these actions;

3. The support engineering staff reviews a log again and identifies a large number of disk I/O (read/write) failures on one host;

4. The engineering support staff determines that such disk I/O errors have happened in multiple disk devices, and so they suspect that there is a known issue with a disk controller. The engineering support staff then engages with a hardware vendor to obtain a replacement or repair of the disk controller and/or the affected disks;

5. Meanwhile, the engineering support staff apply a workaround to separate the affected host from the cluster, and the network issue disappears.

6. In summary, a relatively large number of days are needed in order to perform the foregoing steps in order to find the root cause of the network issue (e.g., a problem with the disk controller).

With the embodiments of the improved troubleshooting technique disclosed herein, at least some of the above manual steps may be avoided, and faster and more efficient troubleshooting will result. FIGS. 4 and 5 illustrate the operation of such improved troubleshooting technique, based on the same or similar fact pattern of a high latency issue.

With reference now to a first part 400 of the troubleshooting process shown in FIG. 4, the health monitoring agents 140A . . . 140N collect health-related metric information that is local to their respective host, at a block 402 ("COLLECT HEALTH-RELATED METRIC INFORMATION").

The block 402 may be followed by a block 404 ("DETECT DISK I/O STUCK ISSUE") and a block 406 ("DETECT NETWORK CRC ISSUE"), wherein at least one of the health monitoring agents 140 detects (from the collected metric information) a disk I/O stuck (e.g., a stalled I/O) issue and a network CRC issue.

The blocks 404/406 may be followed by a block 408 ("EVALUATE PERFORMANCE IMPACT AND SCOPE"), wherein the health monitoring agent(s) 140 and/or the correlation engine 202 determines the type of impact (e.g., increased latency) caused by the identified issues and the scope of the impact (e.g., identifies all of the components in the host(s) that are potentially affected by the increased latency).

The block 408 may be followed by a block 410 ("STORE IN DATABASE"), wherein the correlation engine 202 attaches correlation information to the host-level metric information collected by the agent(s) 140, and stores such metric information having the correlation information attached thereto in the database 204, for use in the current troubleshooting process and also for use as historical data in future troubleshooting processes. The correlation information identifies the issue category (e.g., disk I/O stuck and network latency), the impacted components in a host, and the impacted operations in the host. Timestamps may also be stored in the database 204 with each piece of information, at the block 410.

FIG. 4 may be continued/related to FIG. 5, as shown by a label A at the database 204 in FIGS. 4 and 5.

With reference now to a second part 500 of the troubleshooting process shown in FIG. 5, the cluster-wide health analyzer 206 aggregates the local health-related metric information collected by the health-monitoring agents 140A . . . 140N, at a block 502 ("AGGREGATE HEALTH-RELATED METRIC INFORMATION"). From this aggregated information, the cluster-wide health analyzer 206 is able to generate cluster-wide health-related information from which the cluster-wide health analyzer 206 is able to detect cluster-level performance degradation, at a block 504 ("DETECT CLUSTER-LEVEL PERFORMANCE DEGRADATION"). For example, the cluster-wide health analyzer 206 may identify an overall latency that is affecting the entire cluster, decreases in successfully completed input/output operations (10PS) which are indicative of increased latency in the cluster, etc.

In some implementations, the cluster-wide health analyzer 206 and/or the correlation engine 202 may store the information obtained from blocks 502 and 504 in the database 204, for future use as historical data. The correlation engine 202 may attach correlation information in the cluster-level metric information being stored in the database 204.

The block 504 may be followed by a block 506 ("TRIGGER DIAGNOSIS"), wherein the cluster-wide health analyzer 206 calls the correlation engine 202 to determine the potential cause(s) for the cluster-level performance degradation (e.g., increased latency) detected at the block 504. To perform this determination, the correlation engine 202 may first identify a VM in the cluster that is experiencing the worst performance issue(s), at a block 508 ("IDENTIFY VM WITH WORST PERFORMANCE ISSUE"). The correlation engine 202 may examine, at the block 508, either or both host-level metric information or cluster-level metric information, so as to determine which VM is most impacted.

Next at a block 510 ("IDENTIFY IMPACTED COMPONENT(S)"), the correlation engine 202 identifies the component(s) associated with the VM that are being impacted or potentially impacted by the cluster-wide latency. The correlation engine 202 may also identify, at the block 510, particular operations of the VM that are impacted or potentially impacted, such as disk read/write operations, network transmission operations, etc.

The block 510 may be followed by a block 512 ("CORRELATE WITH POSSIBLE CAUSES (DISK OR NETWORK ISSUE)"), wherein the correlation engine 202 accesses the database 204 to determine potential/possible causes for the cluster-level performance degradation (e.g., increased cluster-level latency). For example, the correlation engine 202 may perform a lookup of the database 204 (depicted by the label A in FIG. 5) by trying to match at least one of the impacted components and impacted operations determined at the block 510, with historical data contained in the database 204. As previously explained above, this matching may be performed by comparing correlation information. In the example of FIGS. 4 and 5, the correlation engine 202 is able to determine that the impacted components/operations determined at the block 510 match the historical information of impacted components/operations that was previously stored in in the database 204 during the block 410 in FIG. 4. From this matching information, the correlation engine 202 is thus able to determine that the potential cause of the cluster-level performance degradation may be due to a disk I/O stuck issue or a network CRC issue.

The block 512 may be followed by a block 514 ("OBTAIN GUIDED TROUBLESHOOTING RECOMMENDATIONS"), wherein the correlation engine 202 calls the troubleshooting workflow engine 208 so as to obtain troubleshooting recommendations. For example, based on the potential causes specified by the correlation engine 202 and on historical data, the troubleshooting workflow engine 208 may retrieve a previously stored troubleshooting workflow that specifies a sequence of steps 1-2-3-4-5 that may be taken to remedy a disk I/O stuck issue, wherein such steps performed in sequence in the troubleshooting workflow may include for example: isolate the disk from the network, then run a test I/O through the disk controller, then check whether the data has been read/written in the disk, etc. The troubleshooting workflow engine 208 may also retrieve a previously stored troubleshooting workflow that specifies a sequence of steps 6-7-3-9-10 that may be taken to remedy a network CRC issue.

According to some embodiments, priorities may be specified for each of the troubleshooting workflows that correspond to each of the potential causes. For example, the troubleshooting workflow to remediate the disk I/O stuck issue may be assigned with a lower priority than the troubleshooting workflow to remediate the network CRC issue, and so the lower-priority troubleshooting workflow to remediate the disk I/O stuck issue is executed after the higher-priority troubleshooting workflow to remediate the network CRC issue. Such priorities may be based on historical data, for example, if the historical data indicates that this type of performance degradation was most often previously determined to have been due to a network CRC issue rather than a disk I/O stuck issue.

According to various embodiments, such troubleshooting workflows obtained by the troubleshooting workflow engine 208 at the block 514 may be previously used troubleshooting workflows that were successful for remediation when a similar problem/issue was encountered in the past, and are now being retrieved for use as recommendations for remedying the present issue(s) being encountered in the distributed system. Thus, the previously used troubleshooting workflows are saved/stored by the troubleshooting workflow engine 208 as historical data that may be applied to similar/same issues that are encountered in the future. It is also further possible for the troubleshooting workflow engine 208 to generate fresh new troubleshooting workflows at the block 514. For instance, a fresh troubleshooting workflow may be generated by the troubleshooting workflow engine 208 based at least in part on the available information (pertaining to the issue category, impacted components, and impacted operations) in either or both the host-level metric information or the cluster-level metric information.

Moreover, it is possible for more than one troubleshooting workflow to associated with a single cause. For instance, the network CRC issue may have multiple troubleshooting workflows associated with it, if multiple possible fixes/remediations are available for addressing the network CRC issue.

These troubleshooting workflows serve as recommendations that are output by the troubleshooting workflow engine 208 at the block 514, such as by outputting the recommendations (including an alarm in some implementations, generated by the correlation engine 202 or by the troubleshooting workflow engine 208, that provides a notification of the cluster-level performance degradation) via the web client 148 that interfaces with the management server 142. Thus, a system administrator 516 operating the web client 148 may view the workflow recommendations and alarm, and initiate remedial actions.

For instance, the management server 142 may execute each troubleshooting workflow in an attempt to remedy the cluster-level performance degradation, at a block 518 ("ATTEMPT REMEDY ACCORDING TO RECOMMENDATION(S)"). If the execution of a first troubleshooting workflow does not result in solving the cluster-level performance degradation ("ISSUE STILL EXISTS?—YES" at a block 520), then the management server 142 proceeds to execute a next/second troubleshooting workflow that has been recommended by the troubleshooting workflow engine 208.

If, at the block 520, the issue no longer exists ("NO" at the block 520), then the execution of the current troubleshooting workflow has successfully remedied the issue, and the troubleshooting process may end at a block 522 ("DONE").

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1 to 5.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment and/or storage nodes in distributed storage system), wherein it would be beneficial to provide improved troubleshooting.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method to perform troubleshooting in a distributed system that includes a plurality of hosts arranged in a cluster, the method comprising:
obtaining host-level metric information pertaining to health of a host in the cluster;
based at least in part on the host-level metric information, obtaining cluster-level metric information pertaining to health of the cluster;
using the cluster-level metric information to identify at least one troubleshooting workflow to execute to remedy a particular issue in the distributed system; and
executing the at least one troubleshooting workflow.

2. The method of claim 1, wherein:
the at least one troubleshooting workflow comprises a stored historical troubleshooting workflow that was previously used to solve a previous issue that correlates to the particular issue, and
the at least one troubleshooting workflow further comprises a new troubleshooting workflow that is generated based at least in part on the host-level metric information or the cluster-level metric information.

3. The method of claim 1, wherein executing the at least one workflow includes:
executing a first troubleshooting workflow;
if the particular issue still exists after execution of the first troubleshooting workflow, then executing a second troubleshooting workflow; and
if the particular issue is remedied after execution of the first troubleshooting workflow, then ending troubleshooting of the particular issue.

4. The method of claim 1, further comprising:
receiving the host-level metric information, which is collected by a health monitoring agent, with first correlation information attached thereto;
receiving the cluster-level metric information, which is generated by aggregating the host-level metric information, with second correlation information attached thereto; and
storing the host-level metric information and the cluster-level metric information, having the first and second correlation information attached thereto, as historical information for use in identifying troubleshooting workflows for future troubleshooting.

5. The method of claim 4, wherein the first correlation information and the second correlation information each specify at least one of: a category of the particular issue, at least one component of the host that is impacted by the particular issue, and at least one operation of the host that is impacted by the particular issue.

6. The method of claim 1, wherein using the cluster-level metric information to identify the at least one troubleshooting workflow includes:
using correlation information attached to the cluster-level metric information to search for matching correlation information;
based on the matching correlation information, identifying at least one potential cause of the particular issue; and
based on the identified at least one potential cause of the particular issue, identifying the at least one troubleshooting workflow to execute to remedy the particular issue.

7. The method of claim 1, wherein the distributed system comprises a distributed storage system provided by a virtualized computing environment.

8. A non-transitory computer-readable medium having instructions stored thereon, which in response to execution by one or more processors, cause the one or more processors to perform or control performance of a method to perform troubleshooting in a distributed system that includes a plurality of hosts arranged in a cluster, wherein the method comprises:
determining first correlation information for host-level metric information pertaining to health of a host in the cluster, and storing the host-level metric information along with the first correlation information;
determining second correlation information for cluster-level metric information pertaining to health of the cluster, wherein the cluster-level metric information is based at least in part on the host-level metric information;
comparing the second correlation information with the stored first correlation information to determine at least one potential cause of a particular issue in the distributed system; and
calling a troubleshooting workflow engine to troubleshoot the particular issue by identifying at least one troubleshooting workflow to execute to remedy the particular issue, wherein the at least one troubleshooting workflow corresponds to the at least one potential cause.

9. The non-transitory computer-readable medium of claim 8, wherein the method further comprises:
storing the cluster-level metric information along with the second correlation information, wherein the host-level metric information and the cluster-level metric information stored along with their respective first and second correlation information are stored as historical data; and
using the stored historical data to perform additional troubleshooting in the distributed system, by:
using the historical data to identify at least another potential cause of another particular issue in the distributed system; and
calling the troubleshooting workflow engine to troubleshoot the additional particular issue by identifying at least one additional troubleshooting workflow to execute to remedy the additional particular issue.

10. The non-transitory computer-readable medium of claim 8, wherein the first correlation information and the second correlation information each specify at least one of: a category of the particular issue, at least one component of the host that is impacted by the particular issue, and at least one operation of the host that is impacted by the particular issue.

11. The non-transitory computer-readable medium of claim 8, wherein comparing the second correlation information with the stored first correlation information to determine the at least one potential cause of the particular issue includes:
using the second correlation information for the cluster-level metric information to search for matching correlation information;
based on the matching correlation information, identifying the at least one potential cause of the particular issue; and
providing the at least one potential cause to the troubleshooting workflow engine to enable the troubleshooting workflow engine to determine, based on the identified at least one potential cause of the particular issue, the at least one troubleshooting workflow to execute to remedy the particular issue.

12. The non-transitory computer-readable medium of claim 8, wherein the particular issue corresponds to a cluster-level performance issue that is visible to a user of the distributed system, wherein the host-level metric information corresponds to a host-level performance issue that is invisible to the user due to fault-tolerant capability of the distributed system, and wherein the cluster-level performance issue becomes visible to the user when the host-level performance issue begins to affect performance of the cluster.

13. The non-transitory computer-readable medium of claim 8, further comprising generating an alarm that provides a notification of the particular issue in the distributed system.

14. The non-transitory computer-readable medium of claim 8, wherein the method further includes:
instructing execution of a first troubleshooting workflow provided by the troubleshooting workflow engine;
if the particular issue still exists after execution of the first troubleshooting workflow, then instructing execution of a second troubleshooting workflow provided by the troubleshooting workflow engine; and
if the particular issue is remedied after execution of the first troubleshooting workflow, then instructing an end to troubleshooting of the particular issue.

15. A network device to perform troubleshooting in a distributed system that includes a plurality of hosts arranged in a cluster, the network device comprising:
one or more processors; and
a non-transitory computer-readable medium coupled to the one or more processors, and having instructions stored thereon, which in response to execution by the one or more processors, cause the one or more processors to perform or control performance of operations that include:
store, as historical data, a plurality of troubleshooting workflows that correspond to causes of issues that have been previously encountered in the distributed system;
in response to receiving information indicative of potential causes of a particular issue in the distributed system, identify at least one troubleshooting workflow amongst the plurality of troubleshooting workflows to execute to attempt to remedy the particular issue; and
execute steps in the at least one of the troubleshooting workflows, until execution of a particular troubleshooting workflow results in remediation of the particular issue.

16. The network device of claim 15, wherein the operations further include:
generate a new troubleshooting workflow based at least in part on host-level metric information pertaining to health of a host in the cluster and cluster-level metric information pertaining to health of the cluster.

17. The network device of claim 15, wherein the particular issue is invisible to a user of the distributed system due to a fault-tolerant feature of the distributed system.

18. The network device of claim 15, wherein the at least one of the troubleshooting workflows includes a first troubleshooting workflow and a second troubleshooting workflow, and wherein the operations further include:
assign a first priority to the first troubleshooting workflow and a second priority to the second troubleshooting workflow, wherein the first priority is higher than the second priority such that the first troubleshooting workflow is executed before the second troubleshooting workflow.

19. The network device of claim 15, wherein the particular issue is a host-level issue that pertains to health of a host in the cluster.

20. The network device of claim 15, the particular issue is a cluster-level issue that pertains to health of the cluster.

* * * * *